(No Model.)

G. F. MILLIKEN.
MAGNETO TELEPHONE.

No. 262,811. Patented Aug. 15, 1882.

Witnesses:
Miller C. Earl
Edwin T. Rice Jr.

Inventor:
George F. Milliken
by his Attorney,
Frank L. Pope

UNITED STATES PATENT OFFICE.

GEORGE F. MILLIKEN, OF BOSTON, MASSACHUSETTS, ASSIGNOR OF TWO-THIRDS TO JAMES WENTWORTH BROWN AND HENRY D. HYDE, BOTH OF SAME PLACE.

MAGNETO-TELEPHONE.

SPECIFICATION forming part of Letters Patent No. 262,811, dated August 15, 1882.

Application filed April 24, 1882. (No model.)

*To all whom it may concern:*

Be it known that I, GEORGE F. MILLIKEN, a citizen of the United States, residing in Boston, in the county of Suffolk and State of Massachusetts, have invented a new and useful Improvement in Magneto - Telephones, of which the following is a specification.

My invention relates to certain improvements in the construction of speaking-telephones; and these improvements have special reference to the particular class of telephones in which currents of electricity are generated by the vibrations of a coil of insulated wire within the field of manetic force produced by a series of permanent magnets. The vibrations of the coil of insulated wire are produced by and are correlative with the sonorous vibrations of the air impinging upon a suitable diaphragm, and the electric currents or impulses developed in the convolutions of the helix by the variations in the magnetic force to which it is subjected are transmitted through suitable conductors to a second instrument of similar construction, which reproduces the original sound-vibrations by means of the coil of insulated wire, which is attracted or repelled by its permanent magnet in accordance with the direction of the currents traversing its convolutions, these vibrations being communicated to the diaphragm, and thus to the air.

Considerable difficulty has hitherto been experienced in supporting the coil or helix of wire in such a manner as not to impair the free vibration of the diaphragm, and thus prevent it from responding accurately to vibrations of small amplitude.

The object of my invention is to secure greater freedom of motion on the part of the diaphragm than has been possible in the constructions heretofore employed, and thus secure a more accurate reproduction of the sonorous vibrations which it is desired to transmit.

My invention consists in employing, in combination with one or more permanent magnets, and a diaphragm capable of responding to sonorous vibrations, a hollow cylindrical helix of insulated wire, supported independently of the diaphragm, but capable of being vibrated thereby or of communicating vibrations thereto.

Figure 1:
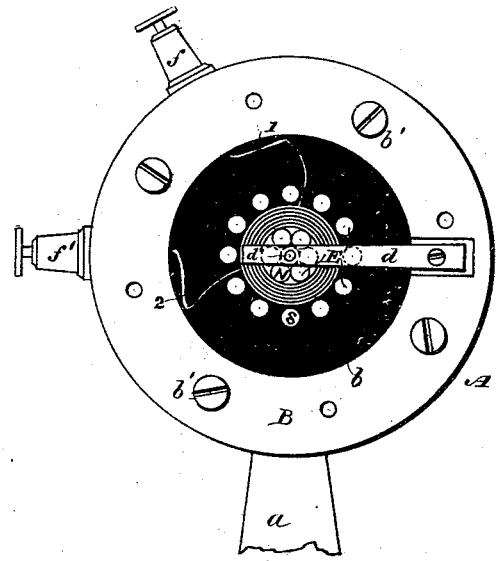
Figure 2:
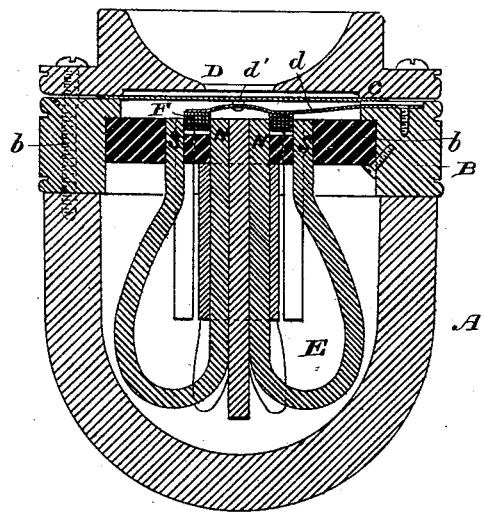

In the accompanying drawings, Figure 1 represents a transverse section of my improved telephone, and Fig. 2 a vertical longitudinal section of the same.

In these drawings, A represents a suitable case for inclosing the permanent magnets E and supporting the various parts of the telephone. The magnets E are supported in an annular section, B, of the case by means of a block, *b*, of hard rubber or other suitable non-magnetic material, through which the poles of the magnets extend. I prefer to group all the magnetic poles of one kind, as at N, at the center of the annular section B, and to arrange the several magnets radially, so that the opposite poles S S form a circle about the central group, thus producing an intervening annular magnetic field of considerable intensity. In the drawings I have shown a greater number of poles in the circle about the central group than in the group itself, the spaces intervening between the poles of the radiating horseshoe-magnets being occupied by short straight magnets. The central magnet of the group N is also represented as a straight magnet.

The section B is rigidly secured to the inclosing-case A by means of suitable screws, *b'*. A diaphragm, D, of thin metal, hard rubber, or other suitable resilient material capable of responding to sonorous vibrations, is rigidly supported in a plane parallel to a line joining the poles N S of the magnets by means of an annular projection, *c*, upon the under surface of the mouth-piece C, which clamps the edges of the diaphragm against a similar ring upon the section B, leaving the center of the diaphragm free to vibrate.

A flexible arm or spring, *d*, of brass or other suitable non-magnetic material, is fastened at one end to the section B and extends beyond the central group of poles, N. Upon this spring *d*, at a point opposite the poles N, is mounted a small block or point of metal or hard rubber, *d'*, which, by the resiliency of the spring, is normally pressed against the center of the diaphragm D, thus forming a yielding mechanical connection or contact therewith. Upon the side of the spring $d$ opposite the point $d'$ is carried a hollow cylindrical coil, F, of thin insulated wire, which surrounds the central group of poles, N, and is interposed between that group and the outer circle of poles, S. The position of the diaphragm with reference to the poles of the magnets is so adjusted that the spring $d$ will normally hold the coil F slightly in advance of the plane of the poles N and S, while it will be free to vibrate to and fro in the direction of its axis. The opposite terminals of the coil F are connected through the thin flexible wires 1 and 2 with the binding-screws $f$ and $f'$, respectively mounted upon the section B. A handle, $a$, is also mounted upon this section for convenience in holding the telephone.

The operation of the telephone is as follows: When employed as a transmitter the sonorous vibrations communicated to the diaphragm D will, through the agency of the projecting point $d'$ and the spring $d$, cause the coil or helix F to be vibrated in unison therewith, intersecting at right angles, or nearly so, the lines of magnetic force produced by the permanent magnets E, thus generating currents of alternating polarity or direction in the coil in a manner well understood. These currents may be transmitted through the usual electric conductors to any suitable form of telephone-receivers.

When the instrument is employed as a receiver the alternating currents transmitted through the coil F will cause the same to be drawn farther over the poles of the magnets E or to be repelled therefrom, according to the relative polarities of the poles of the magnets and of the coil F, which coil or helix, being practically a solenoid, acts in the same manner as a magnet, as is well understood. The vibrations of the coil F are communicated to the diaphragm D through the spring $d$, which is caused to exert a constant but yielding pressure thereon, and these vibrations reproduce the original sonorous vibrations in a well-known manner.

It is evident that instead of employing a group of permanent magnets to produce the magnetic field a single horseshoe-magnet may be used, or an electro-magnet of suitable construction.

I am aware that it is not new to employ in a telephone a hollow cylindrical coil of insulated wire mounted upon or affixed to the diaphragm, and vibrated correlatively therewith across the lines of magnetic force produced by a permanent magnet, and do not broadly claim the same.

What I claim as my invention is—

1. The combination, substantially as hereinbefore set forth, of a diaphragm capable of responding to sonorous vibrations, and a hollow cylindrical helix of insulated wire supported independently of said diaphragm, and having a yielding connection therewith.

2. The combination, substantially as hereinbefore set forth, of a diaphragm capable of being thrown into vibration, one or more stationary permanent magnets, and an independently-supported hollow cylindrical helix of insulated wire situated in the field of force of said permanent magnet or magnets, and having a yielding connection with said diaphragm.

GEORGE F. MILLIKEN.

Witnesses:
J. CONVERSE GRAY,
HENRY D. HYDE.